United States Patent [19]

Drutchas

[11] Patent Number: 4,557,342

[45] Date of Patent: Dec. 10, 1985

[54] HYDRAULIC APPARATUS

[75] Inventor: Gilbert H. Drutchas, Birmingham, Mich.

[73] Assignee: TRW Inc., Cleveland, Ohio

[21] Appl. No.: 496,619

[22] Filed: May 20, 1983

[51] Int. Cl.$^4$ .............................................. B62D 5/08
[52] U.S. Cl. ...................................... 180/132; 60/384; 91/448; 180/142; 417/295
[58] Field of Search .............. 180/132, 141, 142, 143; 60/384; 91/444, 448; 417/295, 299, 310, 440; 418/15

[56] References Cited

U.S. PATENT DOCUMENTS

| | | | |
|---|---|---|---|
| 2,362,724 | 11/1944 | Shea | 417/299 |
| 2,642,804 | 6/1953 | Bowers | 417/295 |
| 3,578,883 | 5/1971 | Cheney | 417/295 X |
| 3,693,747 | 9/1972 | Nishikawa | 180/143 |
| 3,790,307 | 2/1974 | Aldinger | 417/270 |
| 3,881,567 | 5/1975 | Leiber | 180/142 |
| 3,901,343 | 8/1975 | Inoue | 180/142 |
| 3,913,620 | 10/1975 | Pauliukonis | 137/625.64 |
| 4,006,792 | 2/1977 | Bundschuh | 180/143 |
| 4,011,029 | 3/1977 | Shimizu | 417/269 |
| 4,311,161 | 1/1982 | Narumi et al. | 180/143 X |
| 4,344,284 | 8/1982 | Lang | 180/132 X |
| 4,410,059 | 10/1983 | Nakayama et al. | 180/143 |
| 4,470,766 | 9/1984 | Masica et al. | 417/299 |
| 4,516,918 | 5/1985 | Drutchas et al. | 418/15 |

FOREIGN PATENT DOCUMENTS

| | | |
|---|---|---|
| EPA 0071909 | 2/1983 | European Pat. Off. . |
| 2205875 | 5/1974 | France . |
| 2402568 | 4/1979 | France . |
| 2409900 | 6/1979 | France . |
| 6246 | 1/1979 | Japan . |
| 2004822 | 4/1979 | United Kingdom . |

Primary Examiner—Joseph F. Peters, Jr.
Assistant Examiner—Charles R. Watts
Attorney, Agent, or Firm—Yount & Tarolli

[57] ABSTRACT

An apparatus for turning a steerable vehicle wheel includes a pump assembly which is connected with a reservoir through an inlet valve. Upon rotation of a steering wheel, the inlet valve is actuated to allow fluid to flow from the reservoir to the pump assembly at a rate which varies as a function in variations in the speed of rotation in the steering wheel or the torque applied to the steering wheel. The output from the pump assembly is conducted to a directional control valve which is actuated upon initial rotation of the steering wheel to direct fluid flow to the power steering motor to effect turning movement of the steerable vehicle wheel in a desired direction. The rate at which the power steering motor turns the steerable wheel is determined by the extent to which the inlet valve is opened and is independent of the directional control valve.

14 Claims, 16 Drawing Figures

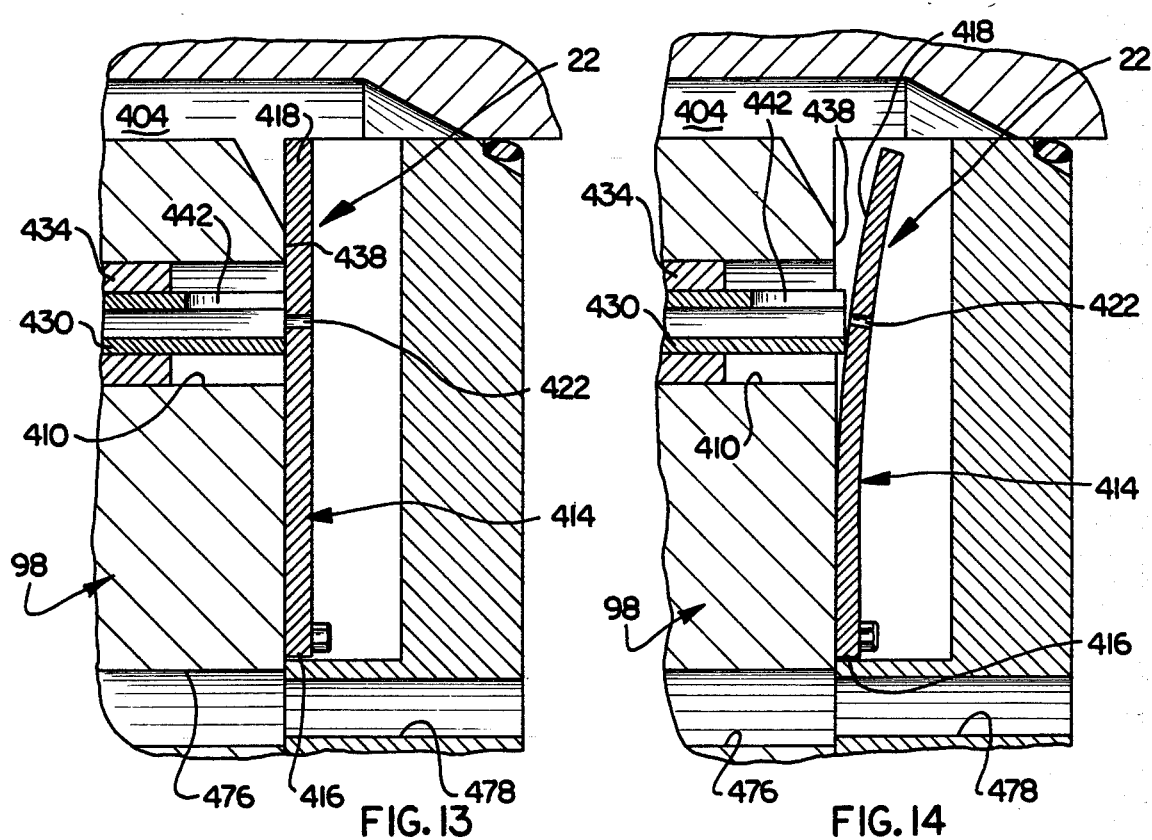
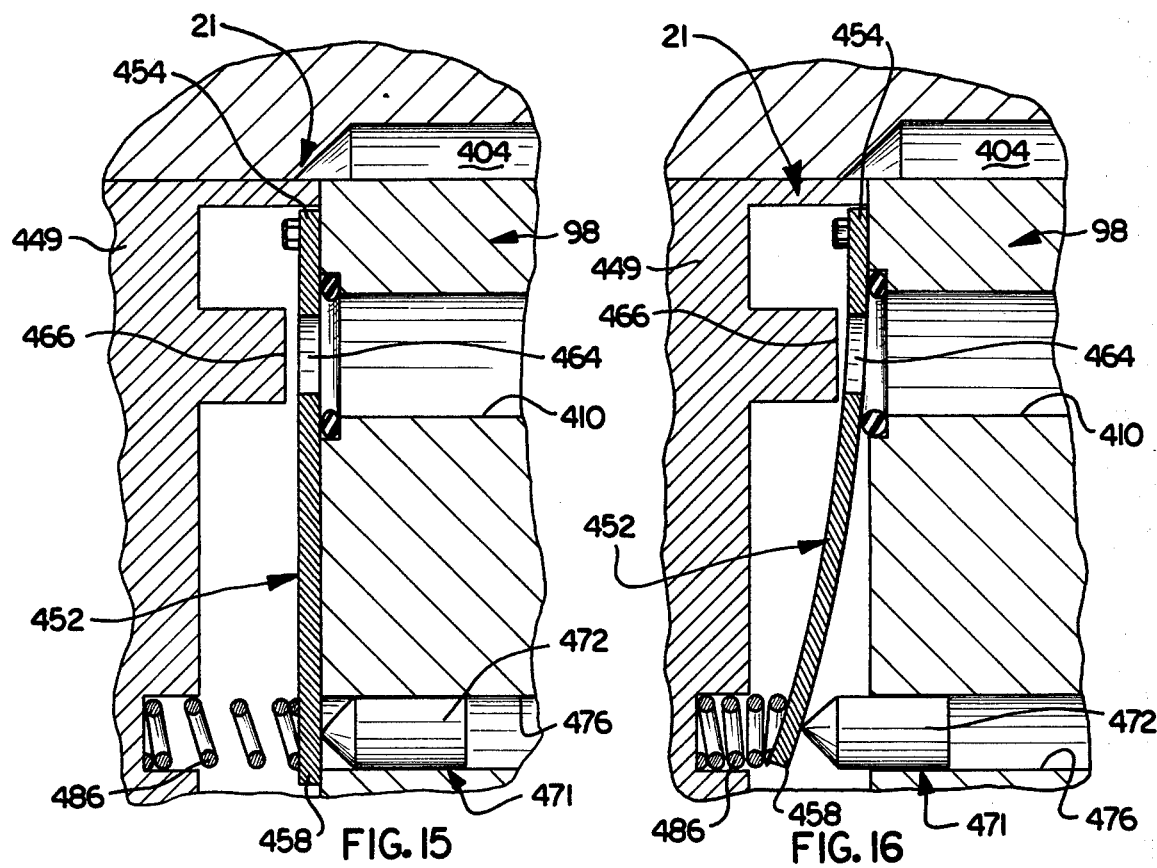

HYDRAULIC APPARATUS

BACKGROUND OF THE INVENTION

The present invention relates to hydraulic apparatus, and in particular to a hydraulic power assist for a manual steering system for an automotive vehicle.

Normally, in an automotive vehicle, the vehicle is steered by a manual interconnection between a hand wheel, i.e., steering wheel and the steerable wheels of the vehicle. The interconnection includes a gear reduction or steering gear set. A hydraulic system is coupled to a steering gear to assist the operator by lessening the manual effort required to steer the wheels.

A typical hydraulic power steering assist system includes a power steering pump and a power steering motor. The motor is connected to the manual steering gear and provides the assistance to the vehicle operator's manual steering effort. The pump is driven by the vehicle engine. A valve is interposed between the pump and power steering motor. The valve controls fluid flow from the pump to the power steering motor. The valve responds to turning of the vehicle steering wheel. The valve functions to control (i) the direction of fluid flow to the steering motor and (ii) the magnitude of the flow to achieve the desired amount of steering assist.

The vehicle steering maximum steering efforts usually occur at low vehicle speeds. Hence, the pump is required to deliver maximum flow and pressure at low engine speeds.

The pumps which are used in power steering systems normally provide an increasing output flow as pump speed increases. Some pumps have increasing flow up to a predetermined speed, and thereafter provide a substantially constant output flow at pump speeds above the predetermined speed. Such flow characteristics are achieved by different pump constructions. Typical pump constructions are shown in U.S. Pat. Nos. 4,014,630; 3,817,266; and 4,516,918. A certain amount of energy is used to drive each pump. Clearly, it is desirable to provide a steering system in which less energy is used for driving the power steering pump.

Moreover, there has been an increasing interest in using electronic elements in hydraulic power assisted steering systems. Known systems commonly include an electrically actuated valve which controls both direction of fluid flow and magnitude of fluid flow to the steering motor. Such a valve must operate at high flow and high pressure and consequently has substantial fluid forces acting thereon. As a result, a solenoid or other means for moving the valve must be relatively large, thus having high power requirements.

Also, under certain operating conditions, the power steering pump may be required to supply fluid under high pressure. Sometimes, the pressure developed by the pump becomes excessively high. For example, when the wheels of the vehicle encounter a large resistance to turning. This results in an increased engine load which tends to stall a small engine. Pressure limiting valves are used to avoid such high pressures being generated by the pump.

SUMMARY OF THE PRESENT INVENTION

The present invention provides a new and improved hydraulic apparatus which may be used to assist in the steering of a vehicle. In particular, the present invention provides a new and an improved hydraulic power steering system which incorporates electrically operated valves. The system is structured so that the power steering pump requires minimum energy (fuel) and small solenoids can be used to move the valve or valves in the system.

In accordance with the present invention, the valve which controls the magnitude of the flow to the steering motor is separated from the valve which controls the direction of flow. Preferably, the valve which controls the magnitude of the flow is a pump inlet valve.

Pump Flow Control Inlet Valve

Before and after rotation of the steering wheel, the pump inlet valve minimizes fluid flow from the reservoir to the power steering pump. The power required to drive a hydraulic pump is related to the flow thereof. By minimizing fluid flow to, and consequently from, the pump, the pump performs little work and the power required to drive the pump is low. Upon initiation of a vehicle steering maneuver, i.e., rotation of the steering wheel, the pump inlet valve is opened in accordance with steering requirements to allow fluid to flow to the pump.

The inlet valve may be opened in response to different signals created by a steering operation. For example, the inlet valve may be opened to provide the desired steering action for a particular vehicle.

During a steering operation, the inlet valve may also be controlled in accordance with vehicle velocity. Specifically, the greater the vehicle velocity, the more the inlet valve may throttle fluid flow to the pump. However, at relatively low or zero vehicle velocity where maximum steering assist is desired, the inlet valve is not controlled by vehicle velocity.

The pump inlet valve includes a valve member which is biased toward a first, almost closed, position in which the valve member limits fluid flow from the reservoir to the power steering pump to a minimum. A solenoid acts on the valve member and moves the valve member from the first position to an open position in accordance with the signal which is received by the solenoid. The valve control signal is produced by a microprocessor unit which receives, processes, and transmits an input signal or signals to control the position of the inlet valve member and thus regulate the quantity of fluid flow to the pump.

In accordance with the preferred embodiment of the present invention, a torque sensor is utilized to control the opening of the pump inlet valve. Specifically, the torque sensor senses the deflection or twisting of a torsion bar located in the steering column and transmits torque between the steering wheel and another member of the steering column which is mechanically connected with the steerable wheel(s) of the vehicle. Thus, turning of the steering wheel, when there is a sufficient resistance to the movement of the steerable wheel(s), causes deflection or twisting of the torsion bar. The torque sensor senses the degree of twist in the torsion bar and creates a signal which after processing in the control means positions the inlet valve in accordance with the direction and amount of twist. Hence, the signal created indicates the direction of twist and actuates the directional control valve to cause steering to occur in the proper direction. Movement of the steerable wheels untwists the torsion bar, and when the wheels achieve the position desired, the torsion bar is no longer twisted. Accordingly, the inlet valve returns to its first position minimizing flow to the pump.

In another embodiment of the invention, the pump inlet valve opens as a function of the rate of rotation of the steering wheel. Thus, the faster the steering wheel is rotated during a steering operation, the more the inlet valve is opened to permit an increased rate of fluid flow to the pump.

Directional Control Valve

The directional control valve is an on-off valve. It comprises two valve portions for controlling flow to the respective two sides of the steering motor. During straight ahead driving, the directional control valve portions are in an open neutral position and communicate pump pressure to the opposite sides of the steering motor. During steering, one portion of the directional control valve is actuated to a fully closed condition in which it blocks flow from the pump to one side of the steering motor and communicates the other side of the steering motor with a reservoir. The pump inlet control valve controls the rate of flow of fluid to the directional control valve and the steering motor. Accordingly, the rate of flow of fluid to the power steering motor is controlled by the pump inlet valve independently of the directional control valve. The directional control valve merely controls the flow direction.

The directional control valve is also solenoid operated. The directional control valve and steering system are constucted so that the directional control valve portions move when pump pressure is relatively low, and the fluid forces on the valve are also low. Specifically, a solenoid is actuated prior to a pressure build-up in the directional control valve due to actuation of the pump inlet valve. Thus, smaller solenoids may be used to move the valve portions.

Power Steering Pump

In order to provide a compact design, a pressure limiting valve and flow control pump inlet valve are mounted on a cam ring of the pump and act on the inlet flow to the pump. The flow control inlet valve is operable to vary the rate of fluid flow through an inlet passage as a function of the rate of rotation of the steering wheel. The pressure limiting valve also acts to throttle inlet flow to the pump and is actuated when the outlet fluid pressure of the pump reaches a predetermined maximum pressure.

DESCRIPTION OF THE DRAWINGS

The foregoing and other features of the present invention will become more apparent upon a consideration of the following description taken in connection with the accompanying drawings wherein:

FIGS. 13 and 14 are enlarged views of a portion of the pump assembly of FIG. 12 illustrating parts in different portions; and FIGS. 15 and 16 are enlarged views of a portion of the pump assembly of FIG. 12 illustrating parts in different positions.

DESCRIPTION OF SPECIFIC PREFERRED EMBODIMENTS OF THE INVENTION

General Description

Figure 1:
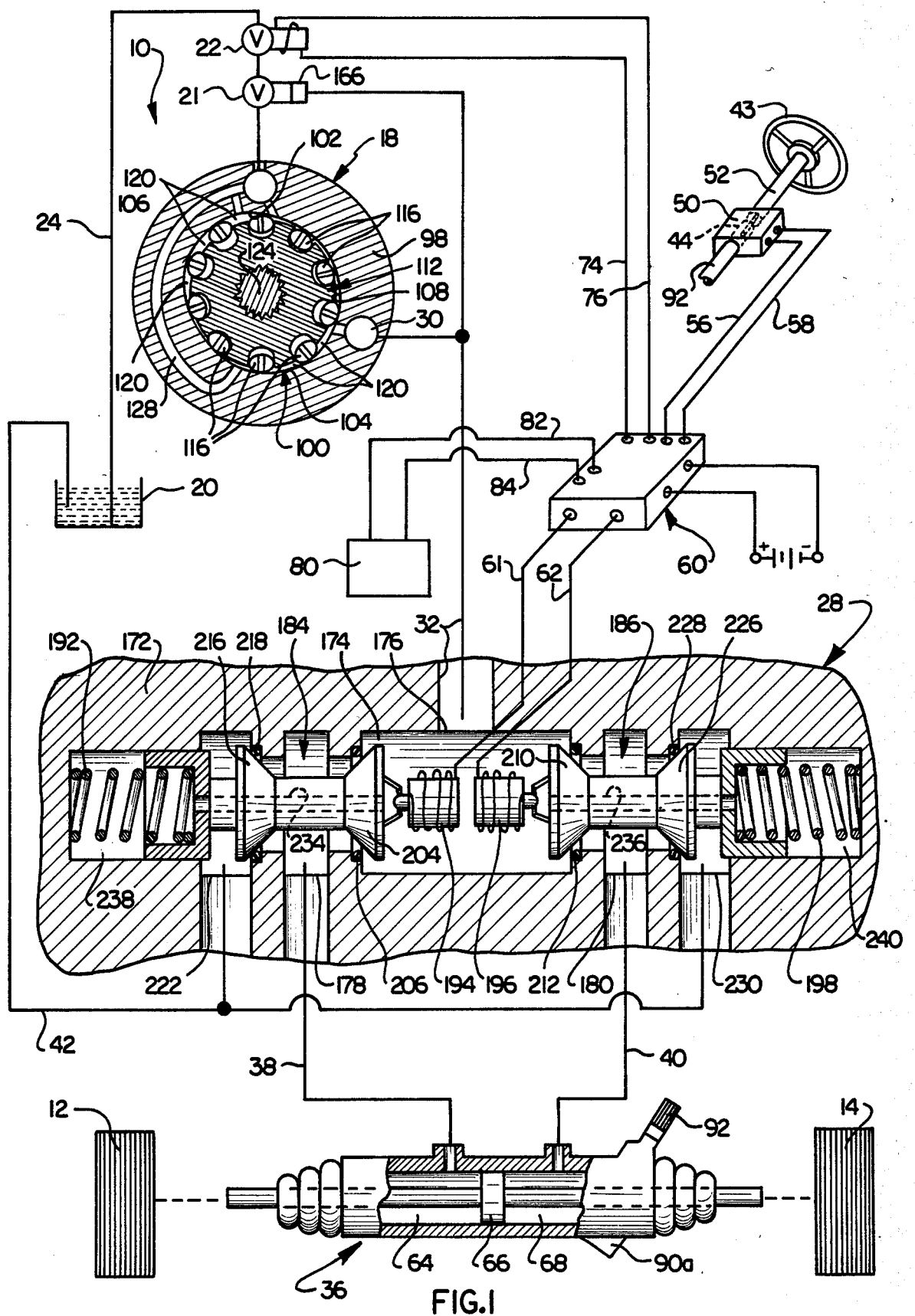
FIG. 1 is a schematic illustration of a steering apparatus constructed in accordance with the present invention.

A steering apparatus 10 for turning steerable vehicle wheels 12 and 14 is illustrated schematically in FIG. 1. The apparatus 10 includes a steering wheel 43 and a sensor 50 for sensing a steering operation.

Figure 8:
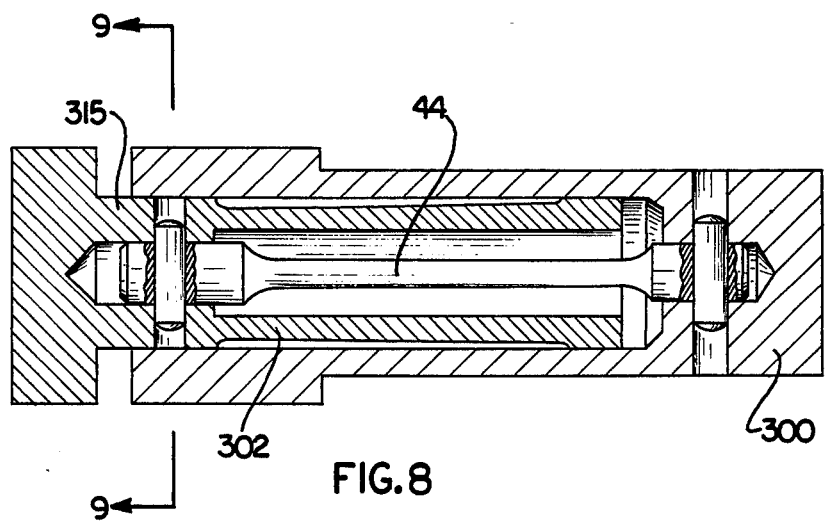
FIG. 8 is a view of a torque sensor used in the apparatus of FIG. 1.

When the operator rotates the steering wheel 43, the frictional resistance to turning between vehicle tires 12 and 14 and the surface which they engage creates a torque in the steering column. The torque passes through a torsion bar 44 (see FIGS. 1 and 8) located in a steering column in series with the steering wheel. A torque sensor 50 is associated with the torsion bar 44. The sensor 50 is an electronic torsion bar deflection sensor. The electronic torsion bar deflection sensor 50 generates a signal related to torque in the torsion bar 44. The signal is transmitted by leads 56, 58 to a microprocessor or electronic control unit 60 (FIG. 1). The signal indicates the direction and amount of twist, of the torsion bar 44. The direction and amount of twist of the torsion bar 44 are related to the direction of steering wheel rotation and the torques passing through the torsion bar.

Other inputs may also be communicated to the electronic control unit 60. One of these other inputs, for example, may be the speed of the vehicle. The electronic control unit 60 receives, processes, and transmits a signal to an inlet control valve 22 and hence controls flow from a power steering pump assembly 18 in response to deflection of the torsion bar 44. The flow control will be described hereinbelow.

The pump assembly 18 is connected in fluid communication with a reservoir 20. The pump inlet includes a pressure limiting (high pressure relief) valve 21, the inlet flow control valve 22 and a conduit 24. The pump assembly 18 is also in fluid communication with a directional control valve assembly 28 through a conduit 32.

The directional control valve assembly 28 is normally open and is in fluid communication with a power steering motor 36 through a pair of conduits 38 and 40. The directional control valve assembly 28 is also in fluid communication with the reservoir 20 through a fluid return conduit 42.

Figure 2:
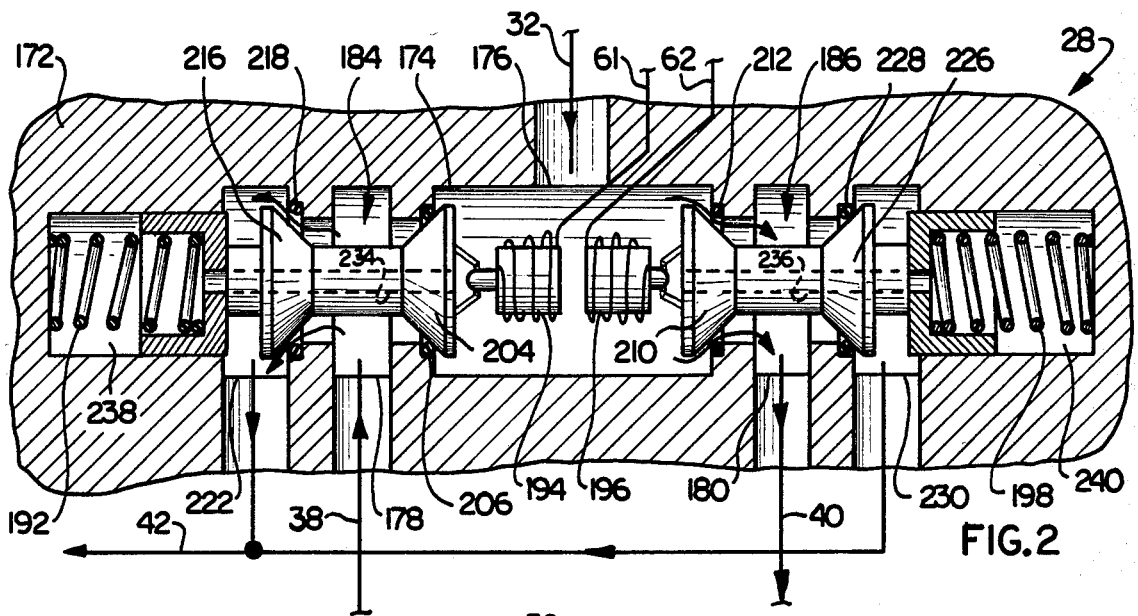
FIG. 2 is a fragmentary illustration of a directional control valve assembly used in the steering apparatus of FIG. 1, the valve assembly being shown in an actuated condition to effect operation of a power steering motor to turn steerable vehicle wheels to the right.
Figure 3:
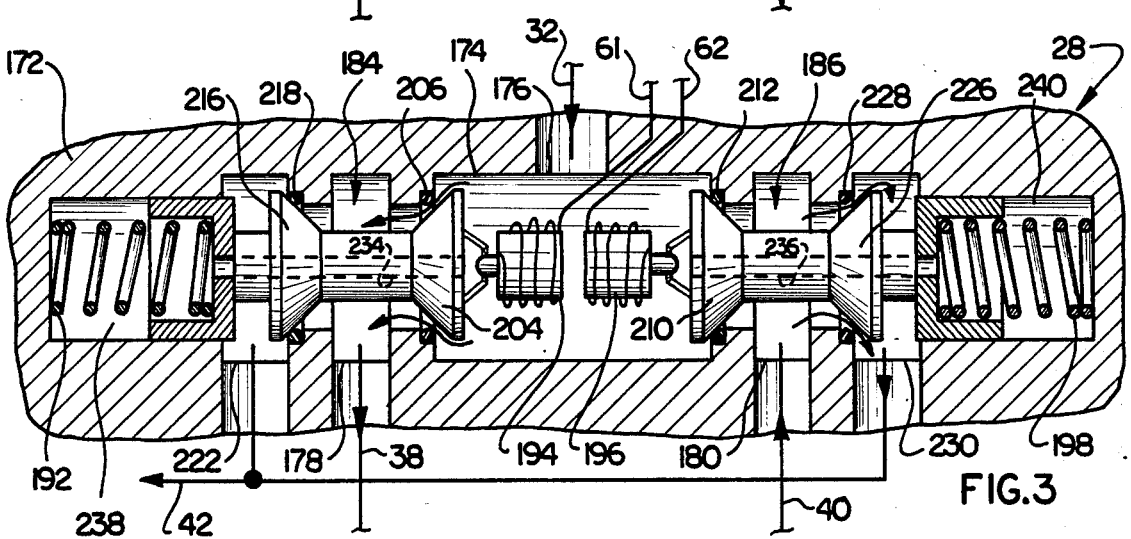
FIG. 3 is a fragmentary illustration of the directional control valve assembly of FIG. 2, the valve assembly being shown in an actuated condition in which the power steering motor effects turning movement of the steerable vehicle wheels to the left.

Deflection of the torsion bar 44 (FIG. 8) results in the transmission of a steering direction signal from the control unit 60 (FIG. 1) to the directional control valve assembly 28 over a lead 61 or 62. The signal actuates the control valve assembly 28 from an initial normally open condition (FIG. 1), in which the conduits 38 and 40 are both connected in fluid communication with the pump assembly 18, to an actuated condition (FIGS. 2 or 3). When the control valve assembly 28 is actuated, one of the motor conduits 38 or 40, depending on the direction of steering column rotation, remains connected with the pump assembly 18 and the other conduit is connected with reservoir 20 through the fluid return conduit 42.

If the torsion bar 44 twists or deflects in a counterclockwise direction, the directional control valve assembly 28 is actuated from the initial condition of FIG. 1 to the left turn condition illustrated in FIG. 3. Fluid from the pump assembly 18 is then ported by the directional control valve assembly 28 to the conduit 38 and motor cylinder chamber 64. Fluid flow into the motor cylinder chamber 64 will move a piston 66 toward the right (as viewed in FIG. 1) to help turn the steerable vehicle wheels. As the piston 66 moves toward the right (as viewed in FIG. 1), fluid is exhausted from a motor cylinder chamber 68 through the conduit 40 and the directional control valve assembly 28 to the fluid return conduit 42.

Conversely, if the torsion bar 44 twists or deflects in a clockwise direction, the directional control valve assembly 28 is actuated from the initial condition of FIG. 1 to the right turn condition of FIG. 2. At this time the conduit 38 is connected with the fluid return conduit 42 through the directional control valve assembly 28. High pressure fluid from the pump assembly 18 is conducted through the conduit 40 to the motor cylinder chamber 68. Fluid flow into the motor cylinder chamber 68 moves the piston 66 toward the left (as viewed in FIG. 1) to turn the steerable vehicle wheels 12 or 14. Fluid is exhausted from the motor cylinder chamber 64 through the conduit 38.

In accordance with one of the features of the present invention, fluid flow from the pump assembly 18 (FIG. 1) to the power steering motor 36 is controlled by the inlet valve 22 independently of the directional control valve assembly 28. When the steering wheel 43 is not being rotated, the inlet valve 22 is in a limit position, throttling and minimizing flow to the pump assembly 18. Specifically, when the inlet valve 22 is in this position a small leakage fluid flow occurs from the reservoir 20 through the conduit 24 to the pump assembly 18. The pump (for lubrication purposes) and the remainder of the hydraulic circuit must always contain hydraulic fluid. Hence, the inlet control valve always permits this small flow to the pump. Accordingly, when the inlet valve 22 is in its limit position, only a small quantity of fluid is being pressurized by the pump assembly 18. Hence, relatively little power is required to drive the pump assembly 18.

As noted above, upon deflection of the torsion bar 44, a signal from the control unit 60 operates the directional control valve assembly 28 to port fluid flow to a motor cylinder chamber 64 or 68. Almost simultaneously, the control unit 60 transmits control signals over leads 74 and 76 to open the inlet valve 22 to allow more fluid to flow from the reservoir 20 to the pump assembly 18. The fluid is pressurized and discharged from the pump assembly 18 to the already actuated directional control valve assembly 28. This fluid pressurizes and provides flow to one of the two motor cylinder chambers 64 or 68, depending upon the direction of rotation of the steering wheel 43.

If the torsion bar continues to twist, the control unit 60 increases the extent to which the inlet valve 22 is opened. Hence, the rate of flow of fluid through the inlet valve 22 to the pump assembly 18 and the rate of flow of fluid from the pump assembly 18 and through the directional control valve assembly 28 to the power steering motor 36 is proportional to the twist of the torsion bar 44.

Also, during a steering operation the inlet valve 22 preferably controls the flow of fluid from the pump assembly 18 to the power steering motor 36 as an inverse function of vehicle speed. A vehicle speed sensor 80 is connected with the control unit 60 through leads 82 and 84. When vehicle velocity is low the steerable vehicle wheels 12 and 14 are relatively difficult to turn and full hydraulic assist to steering is desirable. Thus, at low vehicle speeds the control unit 60 does not affect the actuation of the inlet valve 22 in response to the input from the vehicle speed sensor 80. When vehicle velocity increases above a predetermined minimum, the control unit 60 causes the inlet valve 22 to throttle fluid flow to the pump assembly 18. This results in a reduction in power assistance available for steering as vehicle speed increases. This is a desirable feature since the steerable vehicle wheels 12 and 14 are easier to turn at higher vehicle speeds and the power assistance required in turning the vehicle wheels is reduced or eliminated.

A steering gear set 90a having an input shaft 92 connected with the steering column member 52 through torsion bar 44. Thus a manual steering gear is provided to steer the vehicle without power assistance, such as at vehicle velocities above a predetermined maximum speed or in the event of failure of the pump assembly 18. Since the directional control valve assembly 28 is normally open, the motor chambers 64 and 68 are in fluid communication with each other. This allows the motor piston 66 to be moved by the manual steering gear 90a with a minimum of resistance. The manual steering gear 90a preferably is of the well known rack and pinion type although other types of steering gear may be used.

Pump Flow Characteristics

Figure 4:
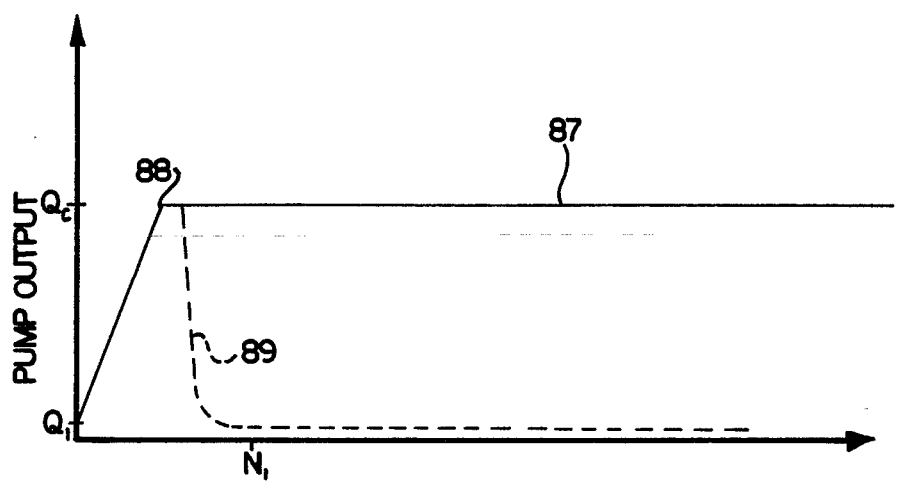
FIG. 4 is a graph illustrating how pump output varies with pump speed.

In the absence of the inlet control valve 22, the output flow from the pump assembly 18 would vary in the general manner shown by solid line 87 in FIG. 4. Thus, upon starting of the engine, the pump output quickly increases to the flow rate indicated at 88 in FIG. 4. This flow rate is obtained before the engine idle speed, indicated at $N_1$ in FIG. 4, is obtained. As the operating speed of the engine increases, the output from the pump remains substantially constant at the output indicated at 88 in FIG. 4. It should be understood that the curve 87 has been shown in FIG. 4 for purposes of illustration and with a specific power limiting pump design in mind and the output of a particular pump assembly 18 may vary in a manner somewhat different than that illustrated in FIG. 4.

In the absence of a steering operation, the inlet valve 22 restricts fluid flow to the pump assembly 18 in the manner indicated by the first portion of the solid line and the dashed curve 89 in FIG. 4. Thus, when pump speed is above engine idle speed, indicated at $N_1$ in FIG. 4, the inlet valve 22 is in its nearly closed position providing maximum restriction to fluid flow from the reservoir 20 to the pump assembly 18. Hence, the flow from the pump assembly 18 is at a minimum, relatively low fluid flow rate, indicated at $Q_1$ in FIG. 4, until a steering operation is undertaken.

Figure 5:
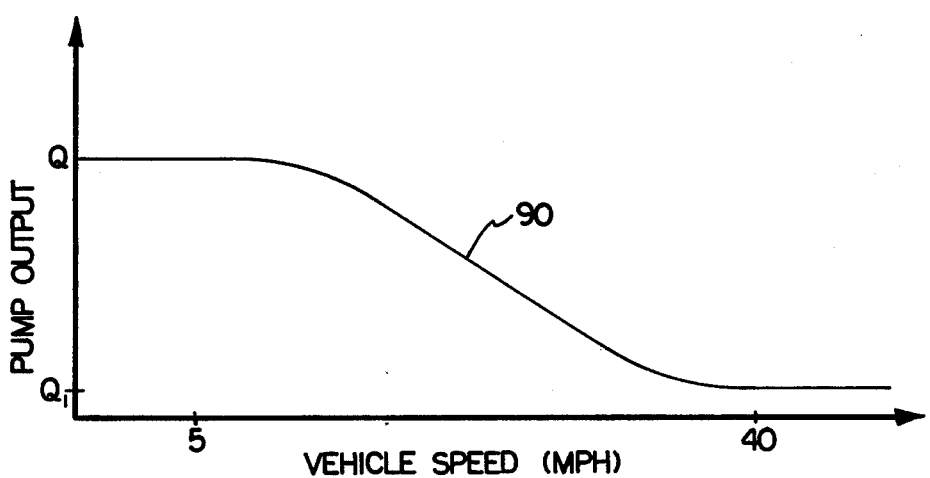
FIG. 5 is a graph illustrating how pump output varies during a steering operation as a result of actuation of a pump inlet control valve as a function of vehicle speed.

FIG. 5 is a theoretical curve showing pump output during a steering operation, assuming the pump assembly 18 is operating above engine idle speed $N_1$ and is controlled only by a vehicle speed signal. As noted above, the vehicle speed sensor 80 cooperates with the control unit 60 to cause operation of the inlet valve 22 to modulate fluid flow from the pump assembly 18. As the vehicle speed exceeds a selected speed, 5 miles per hour for example, signals from the vehicle speed sensor 80 and control unit 60 causes the inlet valve 22 to throttle the flow of fluid from the reservoir 20 to the pump assembly 18 in the manner illustrated by the curve 90 in FIG. 5. The curve 90 is a theoretical curve illustrating the manner in which the vehicle speed sensor causes pump output flow to vary independently of any other control signals during a steering operation.

As vehicle operating speed increases from 5 miles per hour to 40 miles per hour (FIG. 5), signals from the vehicle speed sensor 80 and control unit 60 actuate the inlet valve 22 to gradually throttle the flow of fluid from the pump assembly 18 to the relatively low standby fluid flow rate $Q_1$. As the vehicle speed increases above 40 miles per hour, this low standby fluid flow rate is maintained. It should be understood that the specific speeds of 5 and 40 miles per hour have been set forth for purposes of clarity of illustration and that other speeds could be used if desired. At speeds below five miles per hour the signals from the speed sensor 80 do not control the inlet valve.

During a steering operation at speeds above a predetermined speed, e.g., 5 miles per hour, and below another speed, e.g., 40 miles per hour, the inlet valve 22 is opened to an extent which is a function of the deflection of the torsion bar 44 and vehicle speed. Thus, if the torsion bar 44 is slightly deflected, the control unit 60 causes the inlet valve 22 to throttle the fluid flow indicated by the curve 90 (FIG. 5) to the fluid flow indicated by the curve 91 in FIG. 6. As the torsion bar deflects more, the extent to which the inlet valve 22 throttles the flow of fluid to the pump assembly 18 is decreased toward a flow value which approaches but never exceeds the flow value at the same speed for the curve 90.

Figure 6:
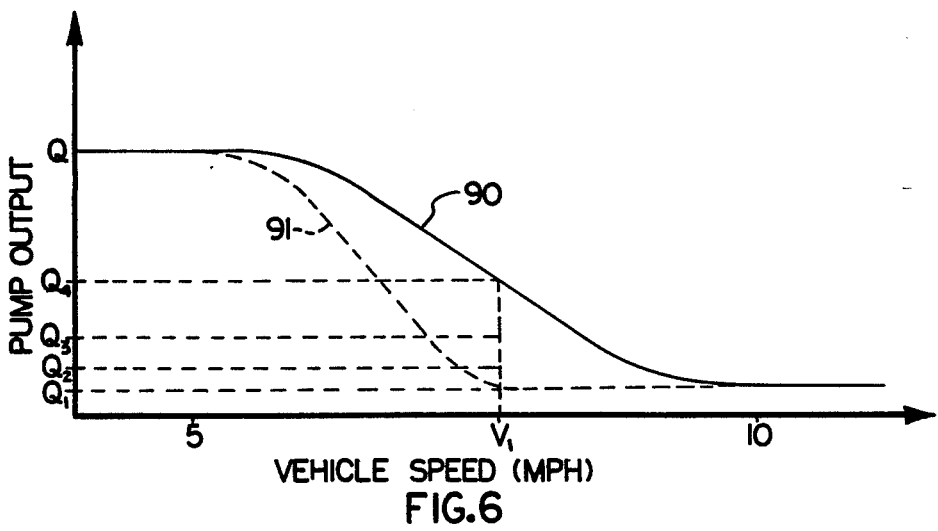
FIG. 6 is a graph illustrating how pump output varies with vehicle speed and variations in the speed of rotation of the steering wheel.

If the vehicle is travelling at the speed indicated $V_1$ in FIG. 6 and the torsion bar 44 is slightly deflected, the inlet valve 22 is actuated to throttle the flow of fluid to a flow rate indicated at $Q_2$ in FIG. 6. If the deflection of the torsion bar is decreased somewhat, the throttling effect of the inlet valve 22 is reduced so that fluid flows to the power steering pump at the rate indicated at $Q_1$. If the deflection of the torsion bar is increased, the throttling effect of the inlet valve 22 is increased to a fluid flow rate such as indicated at $Q_3$ or $Q_4$. At speeds above a predetermined speed, e.g., 40 miles per hour, the inlet valve is controlled by the vehicle speed sensor and not the torsion bar sensor, and the flow rate is maintained at $Q_1$.

Pump Assembly

The pump assembly 18 includes a cam ring 98 having a radially inner circumferential surface 100 which defines an ellipse having a pair of opposite inlet arcs 102 and 104. The elliptical surface 100 of the cam ring 98 also defines a pair of opposite outlet arcs 106 and 108. A sealing arc is provided between the outlet arc 106 and the inlet arc 104. A sealing arc is also provided between the outlet arc 108 and the inlet arc 102.

A cylindrical rotor 112 is located within and is circumscribed by the cam ring 98. Pumping elements or slippers 116 are slidably mounted in the rotor and are biased radially outwardly into sealing engagement with the inner surface 100 of the cam ring 98. The pumping elements 116 cooperate with the cam ring 98 and end plates (not shown) to define an array of pumping or working chambers 120. The chambers 120 hold fluid and/or air and are moved along an elliptical path defined by the cam ring 98 as the rotor 112 is rotated in a counterclockwise direction (as viewed in FIG. 1) upon rotation of a drive shaft 124.

Liquid is supplied to the inlet arcs 102 and 104 from the reservoir 20 through the conduit 24, inlet valve 22, pressure relief valve 21 and passages 128 formed in the pump assembly 18. As each of the pumping chambers 120 moves along one of the inlet arcs 102 and 104, the pumping elements 116 that define the chamber move radially outwardly and the chamber expands to reduce the pressure in it. The reduction in pressure in the pumping chambers 120 at the inlet arcs 102 and 104 draws fluid through the inlet valve 22 and inlet passage 128 to the pumping chambers.

As each pumping chamber 120 continues to move along its path within the cam ring 98, the chamber sequentially moves from one of the inlet arcs 102 or 104 to one of the outlet arcs 106 or 108. As a pumping chamber 120 moves along an outlet arc 106 or 108, the pumping elements or slippers 116 which define the chamber are forced radially inwardly. Therefore, the volume of the chamber 120 is reduced to increase the fluid pressure. The pressurized fluid leaves a pumping chamber 120 through one or more of a series of outlet openings disposed along the outlet arcs 106 and 108. The outlet openings are connected in fluid communication with the pressure relief or bypass valve 21 through openings 30.

It is preferred to construct the pump assembly in the manner disclosed in U.S. patent application Ser. No. 381,702, filed on May 25, 1982, Gilbert Henry Drutchas and Phillip Burton Spencer entitled "Pump Assembly". However, the pump assembly 18 could have a construction other than the specific construction shown in the aforementioned U.S. patent application.

Inlet And Pressure Limiting Valve

Figure 7:
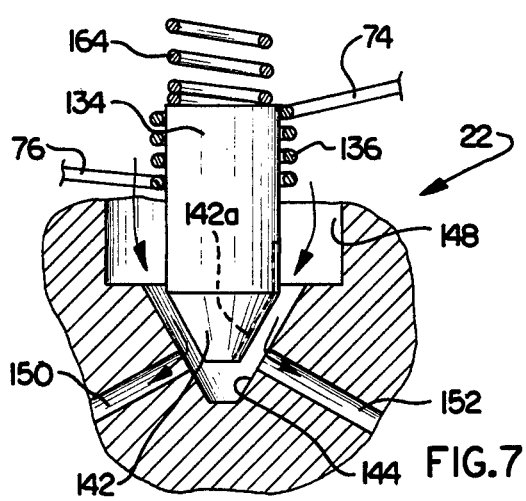
FIG. 7 (on sheet No. 2 of the drawings) is a fragmentary illustration of an inlet valve used to control the rate of the flow of fluid into the power steering pump to thereby control the rate of operation of the power steering motor.

The inlet valve 22 is illustrated schematically in FIG. 7. The inlet valve 22 includes a plunger 134 which is moved by a magnetic field created by a solenoid coil 136 electrically connected with the control unit 60 by the leads 74 and 76. When the inlet valve 22 is in its maximum flow limiting position, a frustoconical tip 142 engages a frustoconical valve seat 144 to block fluid flow from the conduit 24 through an inlet opening 148 to conduits 150 and 152 connected in fluid communication with the inlet arcs 102 and 104 through the internal passages 128 in the pump assembly 18. The aforementioned minimum flow is established by a small groove(s) 142a which allows some flow past the plunger 134.

The solenoid coil 136 is energized by an electrical driving circuit in the control unit 60. The driving circuit in the control unit 60 pulse modulates the solenoid coil 136. The duty cycle time of the pulses determines the extent to which the plunger 134 is opened against the influence of a biasing spring 164. The distance the plunger 134 is withdrawn from the seat 144 by the driving signal will depend upon the mean effective current or duty cycle time of the pulses. The frequency of the pulses is sufficiently large that the plunger 134 is held in an open condition where it merely dithers slightly in response to the pulses.

When the torsion bar 44 deflects and vehicle speed is below a predetermined speed, the control unit 60 increases the duty cycle time of the pulses to increase the distance the plunger 134 is withdrawn from the seat 144. The larger opening reduces the throttling effect of the inlet valve 22 to increase the rate of flow of fluid from the reservoir 20 to the pump assembly 18. When the deflection of the torsion bar 44 decreases, the control unit 60 decreases the duty cycle time of the driving pulses so that the biasing spring 164 moves the plunger 134 downwardly (as viewed in FIG. 7) to increase the throttling effect of the inlet valve 22.

The pressure limiting valve 21 (FIG. 1) is connected in series fluid communication with the reservoir 20, flow control valve 22 and a working chamber 120 of the pump assembly 18. When the outlet fluid pressure of the pump assembly 18 approaches a predetermined pressure, the normally open pressure limiting valve 21 is actuated toward a closed condition by a hydraulic actuator 166 to restrict the area of the opening and hence the flow of fluid from the reservoir into the working chambers 120 of the pump assembly 18.

The pressure limiting valve 21 is actuated to restrict fluid flow into the working cavity to the pump assembly 18 whenever the resistance to movement of wheels 12 and 14 reaches a predetermined level. Thus, when the power steering motor 36 reaches an end of stroke condition, that is when the wheels 12 and 14 have been turned as far as possible, the pressure limiting valve 21 is actuated to maintain the outlet pressure of the pump assembly 18 below a predetermined pressure. This reduces the load on the engine of the vehicle to promote a more uniform idle speed of the engine. Although the pressure limiting valve 21 has been shown as being downstream from the flow control valve 22, the pressure limiting valve 21 could be disposed upstream from the flow control valve 22 if desired.

Directional Control Valve Assembly

The directional control valve assembly 28 has an on-off valving function. It performs no pressure modulating, flow modulating, or throttling function. The directional control valve assembly 28 (FIG. 1) includes a housing 172 having a chamber or cavity 174 therein. The cavity 174 has an inlet port 176 which receives pressurized fluid from the pump assembly 18. The flow of fluid from the inlet port 176 to the power steering motor 36 is through motor outlet ports 178 and 180 and is controlled by a left spool or valve member 184 and a right spool or valve member 186.

The valve member 184 is moved from its open or initial position (shown in FIG. 1) against the influence of a biasing spring 192 by a solenoid 194 when a signal is received from the control unit 60 over the lead 61.

Similarly, the valve spool 186 is moved from its open or initial position (shown in FIG. 1) by a solenoid 196 against the influence of a biasing spring 198 when a signal is received from the control unit 60 over the lead 62. Prior to transmitting a signal to the directional control valve assembly 28, the control unit 60 transmits a signal to the inlet control valve 22 to throttle flow to the pump assembly 18. Hence, pump output and consequently pressure is reduced. Thus, when the valve spools 184 and 186 are moved by the solenoids 194 and 196 upon initiation of a steering operation the fluid pressure in the cavity 174 is relatively low so that the valve spools can be easily moved by relatively small solenoids.

Normally, i.e., prior to initiation of a steering operation by rotation of the steering wheel 43, the directional control valve assembly 28 is in the initial or unactuated condition shown in FIG. 1. A frustoconical land 204 on the left valve spool 184 is spaced from a valve seat 206 so that fluid pressure is transmitted from the inlet port 176 to the motor outlet port 178. Similarly, a frustoconical land 210 on the right valve spool 186 is spaced from a valve seat 212 to enable fluid pressure to be transmitted from the inlet port 176 to the motor outlet port 180.

When the directional control valve assembly 28 is in the initial or unactuated condition of FIG. 1, a second frustoconical land 216 on the left valve spool 184 engages a valve seat 218 to block fluid flow between the outlet port 178 and a return port 222 which is in fluid communication with a fluid return conduit 42. Similarly, a second frustoconical land 226 on the right valve spool 186 engages a valve seat 228 to block fluid flow to a second fluid return port 230. Hence, the inlet port 176 is in fluid communication with the motor cylinder chambers 64 and 68 through the outlet ports 178 and 180.

Fluid passages 234 and 236 extend through the valve spools 184 and 186. The passages 234 and 236 conduct fluid pressure from the cavity 174 to spring chambers 238 and 240 to substantially balance the fluid pressure forces across the valve spools when they are in the actuated condition shown in FIG. 2 for the valve spool 184 and in FIG. 3 for the valve spool 186.

At lower vehicle speeds, rotation of the steering wheel 43 to steer the vehicle to the right, causes the inlet valve 22 to open to increase the rate of flow of fluid from the pump assembly 18. Slightly later, the directional control valve assembly 28 is operated from the unactuated condition of FIG. 1 to the actuated condition of FIG. 2 to direct a flow of fluid from the pump assembly 18 to the motor cylinder chamber 68 (FIG. 1).

To cause operation of the directional control valve assembly to the right turn condition of FIG. 2, the solenoid 194 is energized to move the left valve spool 184 from the initial or open position of FIG. 1 to the closed or actuated position of FIG. 2. The valve land 204 engages the valve seat 206 to block fluid flow from the inlet port 176 to the motor outlet port 178. Also, the land 216 on the left valve spool 184 has moved away from the valve seat 218. Therefore, fluid discharged from the pump chamber 64 (FIG. 1) flows through the conduit 38 through the valve seat 218 and return port 222 to the fluid return conduit 42.

When the left valve spool 184 is moved to the closed condition of FIG. 2, the fluid from the pump flows past the valve land 210 on the right valve spool 186 to the motor cylinder chamber 68 (FIG. 1). This causes the piston 66 to move toward the left (as viewed in FIG. 1) to help the operator turn the steerable vehicle wheels 12 and 14 toward the right. The rate of movement of the piston 66 is regulated by the inlet valve 22 which controls the rate of flow of fluid from the pump assembly 18 through the directional control valve assembly 28 to the power steering motor 36.

Upon rotation of the steering wheel 43 to initiate a left turn, the directional control valve assembly 28 is moved from the initial condition of FIG. 1 to the actuated condition shown in FIG. 3. Thus, the control unit 60 energizes the solenoid 196 to move the land 210 on the right valve spool or member 186 into engagement with the valve seat 212. This blocks fluid flow from the inlet port 176 to the motor port 180. Movement of the valve spool 186 moves the second land 226 on the valve spool 186 away from the valve seat 228 enabling fluid to flow from the motor port 180 to the fluid return port 230 which is in fluid communication with the fluid return conduit 42.

The valve member 184 remains in its open condition so that all of the fluid which flows from the pump assembly 18 through the inlet port 176 flows around the land 204 on the left valve spool 184 to the motor port 178 and the motor cylinder chamber 64 (see FIG. 1). This causes the piston 66 to move toward the right (as viewed in FIG. 1) to help the operator turn the steerable vehicle wheels 12 and 14 toward the left.

As the piston 66 moves toward the right (as viewed in FIG. 1) fluid is discharged from the motor cylinder chamber 68 to the conduit 40. This fluid flows around the open land 226 (FIG. 3) on the right valve spool 186 to the fluid return conduit 42. The rate of movement of the piston 66 is controlled by the quantity of fluid supplied by the pump which is controlled by the inlet valve 22 as a function of the deflection of the torsion bar 44.

Torsion Sensor

When the steering wheel 43 is rotated a steering column member 52 is rotated. The steering column member 52 is connected to a coupling member 300 (see FIG. 8) which is also rotated. The coupling member 300 is mechanically connected to the steering column member 52 through a Cardon joint, not shown. The coupling member 300 in part encircles a coupling member 302 (see FIG. 8) which is attached by a Cardon joint, not shown, to the steering gear input shaft 92 (FIG. 1). The steering gear input shaft 92 has a pinion gear (not shown) drivingly connected thereto. The pinion gear is a pinion which meshes with the teeth of a rack (not shown). The assist cylinder motor 36 is mechanically connected to the rack. Hence, movement of the piston 66 drives the rack.

The torsion bar 44 is interposed between the coupling members 300, 302. One end of the torsion bar 44 is pinned to the coupling part 300 and the other end is pinned to the coupling part 302. The torsion bar 44 is located coaxial with the coupling parts 300, 302.

When the steering wheel 43 is rotated and the resistance to rotation of the pinion gear is low, such as occurs if the vehicle wheels are on ice, the torsion bar 44 will drive the pinion with no substantial deflection. Accordingly, torque is transmitted from the steering wheel 10 through the torsion bar 44 to the steering input shaft 92 effecting rotation of the pinion and movement of the rack to pivot the wheels 12, 14 of the vehicle, i.e., the vehicle is steered by manual effort.

If, however, there is a resistance to turning of the wheels 12, 14, relative rotation occurs between coupling parts 300, 302 and the torsion bar 44 is deflected, i.e., twists. The amount of twist and the direction of twist of the torsion bar 44 is sensed by the torsion bar deflection sensor 50 (FIG. 9).

Figure 9:
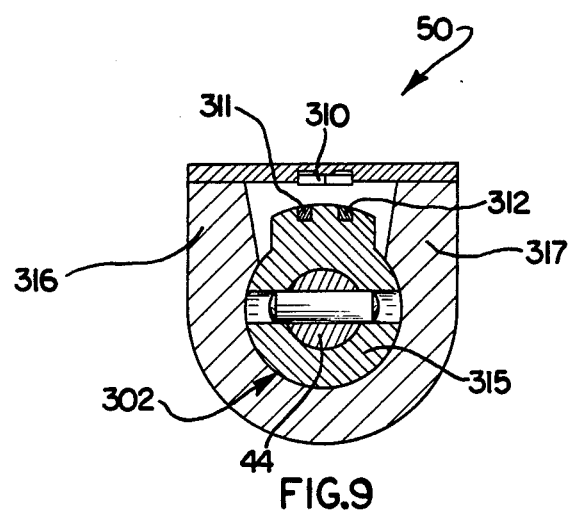
FIG. 9 is a view taken along the line 9—9 of FIG. 8.

The torsion bar deflection sensor 50, shown in FIG. 9, includes a Hall effect device 310 and a pair of magnets 311, 312. The pair of magnets 311, 312 are carried on a portion 315 of the coupling part 302. The portion 315 projects between opposite leg portions 316, 317 of the coupling part 300. The Hall effect device 310 is carried on a plate 318 attached to the coupling part 300.

The magnet 311 has its south pole facing the Hall effect device 310. The magnet 312 has its north pole facing the Hall effect device 310. When these magnets are moved relative to the Hall effect device 310, a signal is created which is delivered to the electronic control unit 60. The signal indicates the direction of rotation and amount of twisting of the torsion bar 44, i.e., the amount of angular movement of one end of the torsion bar relative to the other end, and the direction of twist of the torsion bar. When the magnet 311 is moved toward the Hall effect device 310 and the magnet 312 is moved away from the Hall effect device, the Hall effect device has a positive voltage output relative to the voltage output when the torsion bar is not twisted. Conversely, when the magnet 312 is moved toward the Hall effect device 310 and the magnet 311 is moved away from the Hall effect device, the Hall effect device has a negative voltage output relative to the voltage output when the torsion bar is not twisted. The electronic torsion bar sensor 50 disclosed herein is disclosed to comply with the "best mode" requirement of 35 USC §112.

Summary of Operation

The operation of the system disclosed above should be clear. In the event of a steering operation, i.e., turning of the steering wheel, if the torsion bar 44 twists, a signal will be created by the torsion bar sensor 50. The signal will indicate the magnitude of the twist and the direction of twist of the torsion bar. The signal will be communicated to the control unit 60 which will actuate both the directional control valve assembly 28 and the inlet valve 22. The inlet valve 22 will be actuated to a degree to control the flow of fluid from the reservoir to the steering motor in accordance with the amount of twisting of the torsion bar. Thus, the inlet valve 22 will control the rate of flow of fluid from the pump assembly and thereby the rate of movement of the steering motor 36. The directional control valve 28 when acutated controls the direction of flow of fluid to the steering motor.

As the steering motor 36 is operated, the rack and pinion gear set forming steering gear 90a, will effect the rotation of the shaft 92 and cause an untwisting of the torsion bar. As the torsion bar untwists, the valve 22 will be moved toward its limit position throttling the flow of fluid to the directional control valve 28 and reducing pressure in the chamber 174 of the directional control valve 28.

As a result, if the steering wheel 43 is again actuated, the directional control valve solenoids 194, 196, respectively, will move the respective valve spools against the pressure which is in chamber 174 which is then a relatively low pressure. Thus the solenoids 194, 196 may be relatively small, since they only need move the valve spool against relatively low pressure.

Control Circuitry

Figure 10:
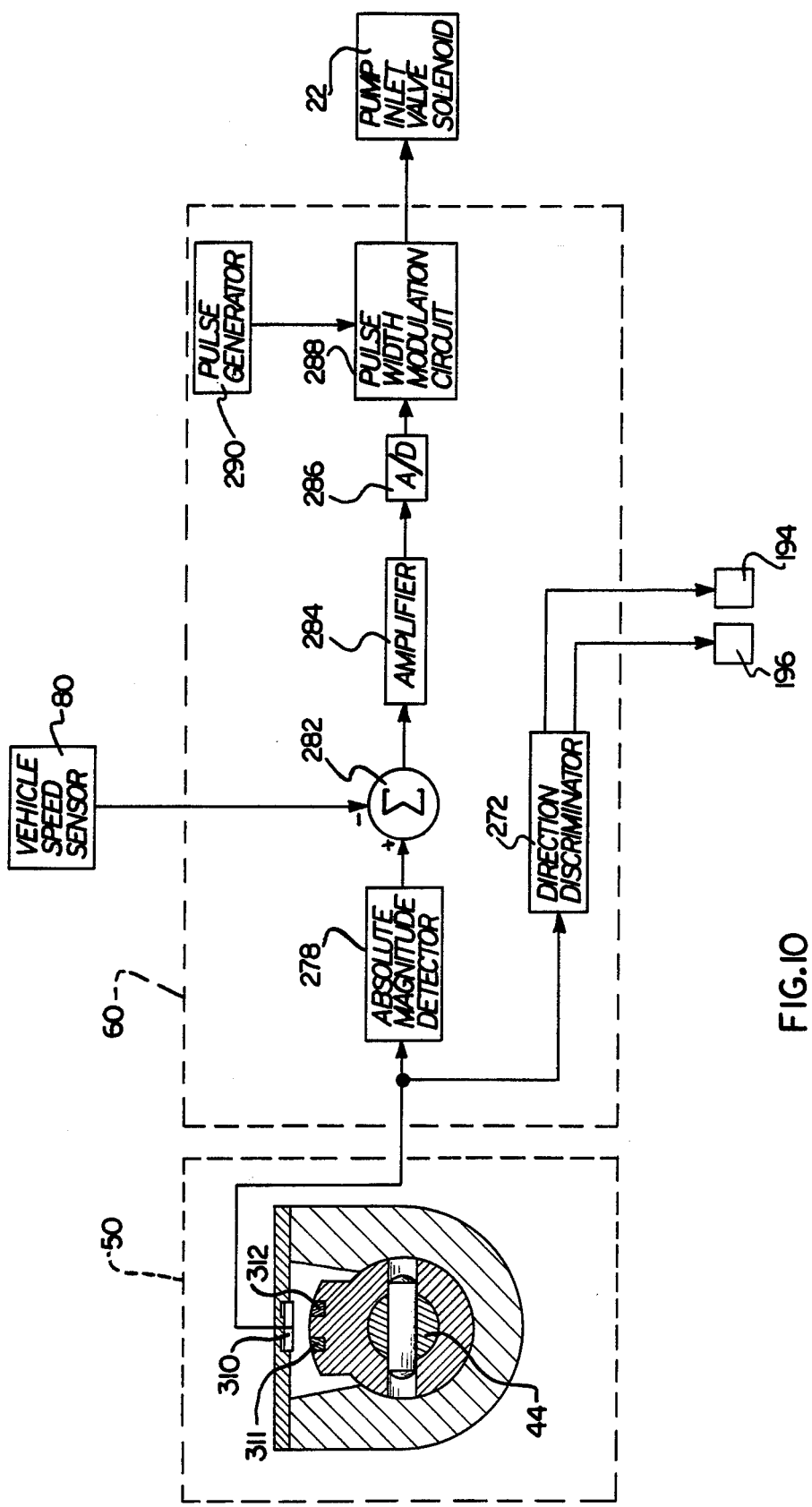
FIG. 10 is a schematic illustration of control circuitry associated with the apparatus of FIG. 1.

A schematic illustration of control circuitry for the torque sensor unit 50 and control unit 60 is illustrated in FIG. 10. Upon rotation of the steering wheel 43, the torsion bar 44 is twisted and the magnets 311 and 312 are moved relative to the Hall effect device 310. When the steering wheel 43 is turned toward the right, the magnets 311 and 312 are moved in a clockwise direction as viewed in FIG. 10, from a center null point. As the magnets 311 and 312 move in a clockwise direction from the central position, the Hall effect device has an increasingly positive output voltage. Conversely, when the steering wheel is turned toward the left, the magnets 311 and 312 are moved in a counterclockwise direction, as viewed in FIG. 10, from the centered position. As the magnets 311 and 312 move counterclockwise from the centered position, the Hall effect device 310 has a decreasingly positive output voltage.

The absolute magnitude of the voltage signal transmitted from the Hall effect device 310, upon rotation of the steering wheel 43 is indicative of the extent to which the torsion bar 44 is twisted and therefore the amount of torque applied to the steering wheel 43. Whether the voltage increases or decreases from the null position voltage, is indicative of the direction of rotation of the steering wheel. When the steering wheel 43 is turned toward the right, the voltage signal from the Hall effect device 310 will become increasingly positive. When the steering wheel is turned toward the left, the voltage signal from the Hall effect device 310 will become decreasingly positive. Although it is preferred to use the Hall effect device 310, other known devices could be used to provide an output signal upon rotation of the steering wheel 43.

The voltage signal from the Hall effect device 310 is transmitted to a direction discriminator 272 in the control unit 60. The direction discriminator 272 responds to the sign of the voltage signal to energize either solenoid 194 or solenoid 196. Thus, upon rotation of the steering wheel 43 toward the right, the voltage signal conducted to the direction discriminator 272 is positive compared to the null position and the solenoid 194 is energized to operate the directional control valve assembly to a right turn condition corresponding to FIG. 2. Conversely, upon rotation of the steering wheel toward the left, the voltage signal conducted to the direction discriminator 272 is negative compared to the null position and the solenoid 196 is energized to actuate the directional control valve assembly to a left turn condition corresponding to FIG. 3.

The absolute magnitude of the voltage signal from the Hall effect device 310 indicates the amount of torque which is being applied to the steering wheel during either a right or left turn. The output signal from the Hall effect device 310 is conducted to an absolute magnitude detector 278. The absolute magnitude detector 278 has an output which is always of a positive sign and has a magnitude which is related to the magnitude of the signal transmitted from the Hall effect device 310.

The output from the absolute magnitude detector 278 and vehicle speed sensor 80 are transmitted to a summing network 282. The signal from the vehicle speed sensor 80 has a negative sign and is subtracted from the positive signal from the absolute magnitude detector 278. The magnitude of the negative signal transmitted from the vehicle speed sensor 88 to the summing network 282 increases as vehicle speed increases.

The output from the summing network 282 is transmitted to an amplifier 284 and an analog to digital converter 286. The output of analog to digital converter 286 is used to control a pulse width modulation circuit 288 which receives a continuous stream of uniform pulses from a pulse generator 290. The output pulses from the pulse width modulation circuit 288 is a stream of pulses having a width which corresponds to the magnitude of the signal transmitted from the summing network 282. Pulses from the pulse width modulation circuit 288 are used to actuate the pump inlet valve solenoid 22 in the manner previously explained.

Second Embodiment

In the embodiment of the invention illustrated in FIGS. 1–10, the inlet valve 22 controls and modulates the flow of fluid to the power steering motor 36 as a function of the twisting of the torsion bar 44. In the embodiment of the invention illustrated in FIG. 11, the inlet valve 22 modulates the flow of fluid to the power steering motor 36 as a function of the rate of rotation of the steering wheel 43. Since the embodiment of the invention disclosed in FIG. 11 has many components which are the same as components of the embodiment of the invention shown in FIGS. 1–10, many of the components of the embodiment of the invention shown in FIG. 11 have been omitted. However, where components similar to those of the embodiment of FIGS. 1–10 are shown, similar numerals will be utilized to designate similar components, the suffix letter "a" being associated with the numerals of FIG. 11 to avoid confusion.

Figure 11:
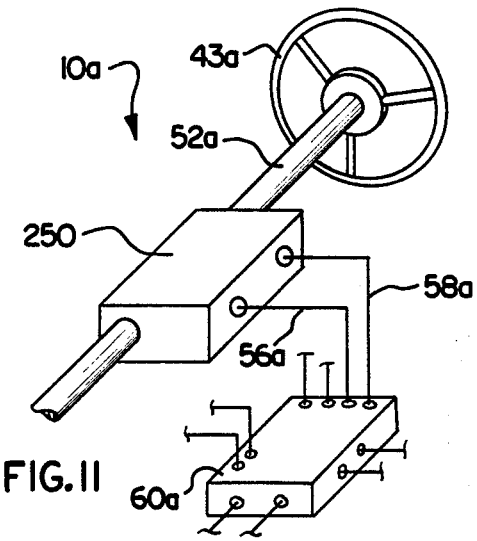
FIG. 11 (on sheet No. 2 of the drawings) is a schematic illustration of a portion of a second embodiment of the present invention.

In the embodiment of FIG. 11, a steering apparatus 10a for turning steerable vehicle wheels includes a sensor unit 250 which is connected with the steering column 52a of a vehicle. Upon rotation of a steering wheel 43a, the sensor unit 250 transmits control signals to a control unit 60a which is similar to the control unit 60 of FIG. 1. The sensor unit 250 detects variations in the speed of rotation of the steering wheel 43a and the direction of rotation of the steering wheel. Therefore, upon rotation of the steering wheel 43a, the sensor unit 250 transmits signals over the leads 56a and 58a to the control unit 60a which are indicative of the direction of rotation of the steering wheel 43a and the speed of rotation of the steering wheel.

When the steering wheel 43a is rotated, the control unit 60a effects operation of an inlet valve, corresponding to the inlet valve 22 of FIG. 1, to vary the rate of fluid flow to a pump assembly and power steering motor in the manner previously explained in connection with FIG. 1. The greater the speed at which the steering wheel 43a is rotated, the greater the extent to which the inlet valve is opened to thereby increase the rate of flow of fluid from the reservoir to the power steering motor. It should be understood that although the pump assembly, inlet valve, directional control valve assembly, and power steering motor have not been shown in FIG. 11 components similar to those shown in FIG. 1 are associated with the components shown in FIG. 11 in the same manner as previously explained in connection with FIG. 1.

Flow Control and Pressure Limiting Valves, Second Embodiment

Figure 12:
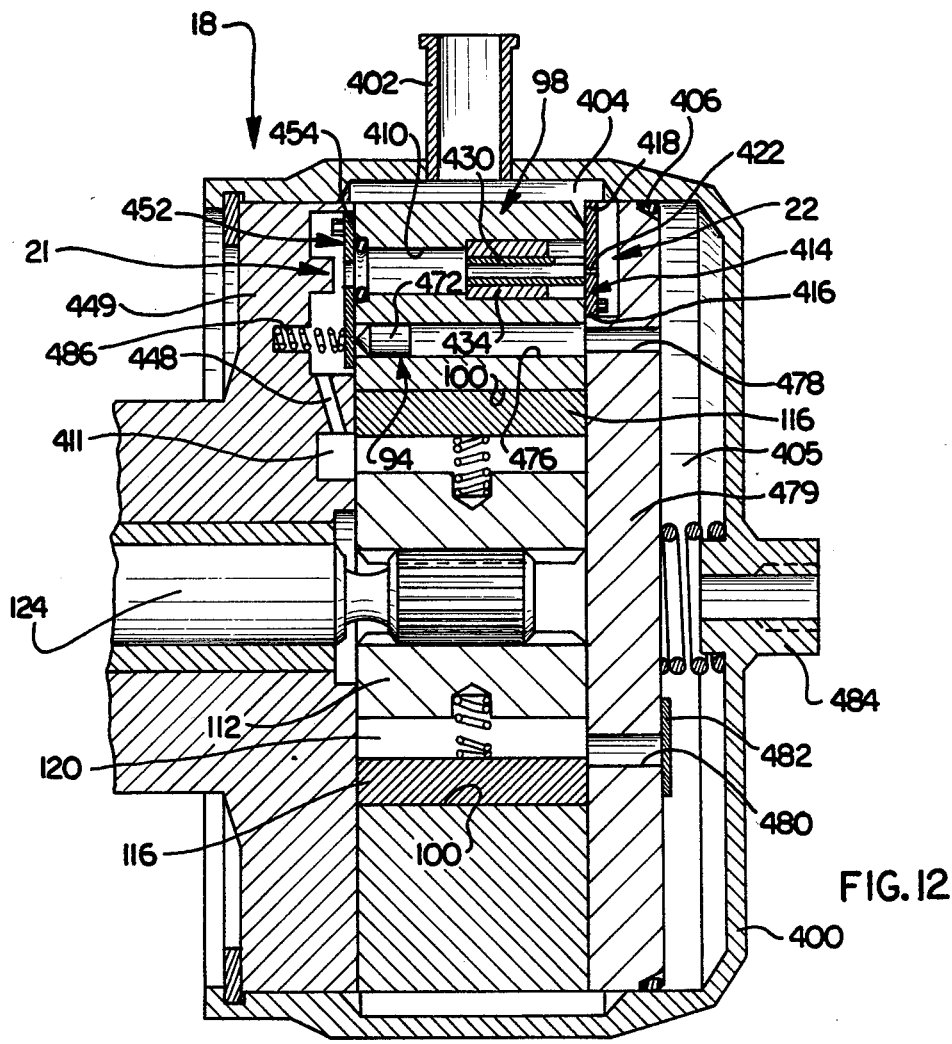
FIG. 12 is a fragmentary sectional view of a pump assembly which may be used in the steering apparatus of FIG. 1.

As shown in FIG. 12 the flow control valve assembly 22 may be mounted on the cam ring 98 of the pump 18 within a pump casing member 400. The flow control valve 22 is connected in fluid communication with the reservoir 20 through an inlet 402. Fluid flows from the inlet 402 to an annular inlet chamber 404 which extends around the cam ring 98 and is separated from an outlet chamber 405 by a seal 406.

The flow control valve 22 is also connected in series fluid communication with the pressure limiting valve 21 through a passage 410 formed in the cam ring 98. The generally cylindrical passage 410 has a central axis which extends parallel to the central axis of the cam ring 98 and the axis of rotation of the drive shaft 124. The pressure limiting valve 21 is connected in series fluid communication with the working chambers 120 of the pump assembly 18 through an inlet passage 411 (FIG. 12).

The flow control valve 22 is located upstream of the pressure limiting valve 21. Thus, fluid flows through the flow control valve 22 before it flows through the pressure relief valve 21. It is contemplated that the arrangement of the valves could be changed so that the fluid would flow through the pressure limiting valve before it flows through the flow control valve.

The flow control valve 22 includes a flat reed valve 414 (see FIG. 13) having an end portion 416 which is fixedly connected with the cam ring 98. The opposite end portion 418 of the reed valve 414 is free to move away from the cam ring 98. A small circular opening 422 is provided in the reed valve 414 so that there is always some fluid flow through the flow control valve 22 when the reed valve is in the position of FIG. 13. This minimal fluid flow provides fluid for lubricating the components of the pump assembly 18 and for maintaining a minimum standby pressure in the system.

Prior to initiation of a steering operation, the flow control valve 22 is in the position shown in FIGS. 12 and 13. When the flow control valve 22 is in such position, there is a restricted flow of fluid from the inlet chamber 404 through the opening 422 (FIG. 13) into a hollow cylindrical plunger 430. The fluid flows through the hollow plunger 430 and the passage 410 to the pressure limiting valve 21.

When a steering operation is undertaken, a cylindrical solenoid coil 434 disposed in the cam ring passage 410 is energized to move the plunger 430 toward the right from the retracted position of FIG. 13 to the extended position of FIG. 14. This movement of the plunger 430 moves the free end portion 418 of the reed valve 414 away from an annular valve seat 438 formed on the cam ring 98. The reed valve 414 flexes due to this action.

When the reed valve 414 moves away from the valve seat 438, fluid from the inlet chamber 404 can flow between the reed valve 414 and the seat 438. This fluid flow enters the plunger 430 through a plurality of slots 442 formed at the right end (as viewed in FIG. 14) of the plunger 430. The fluid flow through the plunger slots 442 joins with the fluid flow through the opening 422 in the reed valve 414 to provide a combined flow which is sufficient to satisfy the demand for power steering fluid. During a steering operation, the solenoid coil 434 is energized by an electronic driving circuit in the control unit 60. The driving circuit of the control unit 60 pulse modulates the solenoid coil 434. The magnitude of the pulses determines the extent to which the plunger 430 is moved toward the right from the retracted position of FIG. 13. Of course, the extent of rightward movement of the plunger 430 determines the extent to which the reed valve 414 is resiliently flexed and the size of the opening around the valve seat 438.

It is contemplated that the pulse modulated driving signal of the solenoid coil 434 will have a frequency of several magnitudes of kilohertz. The distance through which the plunger 434 is moved toward the right from the retracted position of FIG. 13 by the driving signal will depend upon the mean effective current or duty cycle time of the pulses. It should be understood that the frequency of the pulses is so great that the plunger 430 is held in an extended condition.

When the control unit 60 increases the duty cycle time of the pulses to increase the extent to which the plunger 430 is moved toward the right (as viewed in FIGS. 13 and 14). Of course, this increases the size of the opening around the valve seat 438 to reduce the throttling effect of the flow control valve 22 and increase the rate of flow of fluid from the reservoir 20 to the pump assembly 18. When the control unit 60 decreases the magnitude of the driving pulses, the resiliently deflected reed valve 414 moves the plunger 430 toward the left (as viewed in FIG. 13) to decrease the distance between the valve seat 438 and the reed valve 414 to thereby increase the throttling effect of the flow control valve 22. Of course, this results in a reduction of the rate of flow of fluid from the reservoir 20 to the pump assembly 18.

The pressure limiting valve 21 (see FIG. 12) controls the rate of flow of fluid from the reservoir 20 to the inlet passage 128 and working cavity of the pump 18 as a function of the pressure against which the pump operates, i.e., system pressure. Thus, when system pressure is below a predetermined pressure, the pressure limiting valve 21 is in an open condition and has a minimum throttling effect on the flow of fluid from the reservoir 20 through the flow control valve 22 to the working cavity of the pump 18. However, as system pressure approaches a predetermined maximum fluid pressure, the pressure limiting valve 21 is actuated to throttle the rate of fluid flow into the pump. The action of the pressure limiting valve 21 is sufficient to maintain the system pressure below a maximum pressure. Thus, the pump need not work against an excessive system pressure.

Thus, by utilizing the pressure limiting valve 21, the torque required to drive the pump assembly 18 is maintained at a predetermined maximum level. Thus, when the power steering motor 36 has been operated to an end of stroke position in which the wheels 12 and 14 have been turned to the greatest extent possible, the pressure limiting valve 21 is actuated to reduce the rate of flow of fluid into the working cavity of the pump 18 to thereby minimize the torque required to drive the pump.

The pressure limiting valve 21 is mounted on the cam ring 98 at the end of the passage 410 opposite from the flow control valve 22. Thus, the pressure limiting valve 21 is connected in series fluid communication with the flow control valve 22 by the passage 410. The output from the pressure limiting valve 21 flows into the inlet passage 411 (FIG. 12) through a passage 448 formed in an end section 449.

The pressure limiting valve 21 includes a resiliently deflectable reed valve 452 (FIGS. 12 and 15) having an end portion 454 (FIG. 15) which is fixedly connected to the cam ring 98. The reed valve 452 extends across the open end of the passage 410 to a free end portion 458. When the pressure limiting valve 21 is in the open condition of FIG. 15, fluid flows from the passage 410 through a relatively large circular opening 464 formed in the reed valve 452. This fluid flows past a stationary circular valve surface 466 formed on the end section 449 to the passage 448 (FIG. 12) leading to the working cavity of the pump assembly 18.

A hydraulic actuator 471 includes a plunger 472 (FIG. 15) which engages the free end portion 458 of the reed valve 452. The plunger 472 is disposed in a passage 476 formed in the cam ring 98. The passage 476 extends parallel to the passage 410 and is disposed adjacent to the passage 410.

The passage 476 in the cam ring 98 is connected in fluid communication with the pump outlet chamber 405 through a passage 478 (FIG. 12) formed in an end plate 449. Fluid is discharged from the working chambers 120 of the pump 18 through passages 480 and reed valves 482 to the outlet chamber 405. Since the fluid pressure in the outlet chamber 405 is the same as the pressure at which fluid is discharged through an outlet 484 from the pump assembly 18, the plunger 472 (FIGS. 15 and 16) is pressed against the free end portion 458 of the reed valve 452 by a fluid pressure which is the same as pump outlet pressure. The free end portion of the reed valve 458 is biased toward the open position shown in FIG. 15 by its own natural resilience and by a biasing spring 486.

When system pressure approaches a predetermined maximum pressure, the fluid pressure against the piston 472 forces it leftwardly (as viewed in FIGS. 12 and 15) to deflect the reed valve 452 toward the stationary valve surface 466 (see FIG. 16) against the influence of the biasing spring 480 and the resilience of the reed valve 452. When the reed valve 452 is deflected toward the stationary valving surface 466, fluid flow through the opening 464 is throttled or restricted to thereby reduce the rate at which fluid flows into the pump assembly 18.

Specific preferred embodiments of the invention having been described, the following is claimed:

1. An apparatus for controlling fluid flow to a hydraulic motor to turn a steerable vehicle wheel during a steering operation, said apparatus comprising
 a pump for supplying fluid under pressure,
 a reservoir containing a supply of fluid for said pump,
 an inlet valve for varying the rate of flow of fluid from said reservoir to said pump,
 control means associated with said inlet valve member for increasing fluid flow into said pump during a steering operation in either of two opposite directions, and
 an electrically operated directional control valve assembly in fluid communication with an outlet of said pump and responsive to control means, said directional control valve assembly including an inlet port in fluid communication with said outlet of said pump, first and second outlet ports for fluid communication with the power steering motor, a first valve member movable between an open position enabling fluid to flow from the inlet port to the first outlet port and a closed position blocking fluid flow from the inlet port to the first outlet port, first electrically controlled actuator means for moving said first valve member between its open and closed positions, a second valve member movable between an open position enabling fluid to flow from the inlet port to the second outlet port and a closed position blocking fluid flow from the inlet port to the second outlet port, and second electrically controlled actuator means for moving said second valve member between its open and closed positions.

2. An apparatus as set forth in claim 1 further including sensor means for sensing vehicle speed and for directing a vehicle speed signal to said control means, said control means being operable to effect movement of said inlet valve member to reduce the rate of flow of fluid into said pump as vehicle speed increases.

3. An apparatus as set forth in claim 1 further including sensor means for sensing the speed of rotation of a manually rotatable steering wheel and for directing a signal indicative of the speed of rotation of the steering wheel to said control means, said control means being operable to effect movement of said inlet valve member to increase the rate of flow of fluid to said pump as the speed of rotation of the steering wheel increases.

4. An apparatus as set forth in claim 1 further including a torsion bar for connection with a manually rotatable steering wheel and with a mechanism for moving the steerable wheel, said torsion bar twisting upon torque being applied thereto during rotation of the steering wheel, sensor means for sensing the twist of said torsion bar and for directing a signal indicative of the amount of twist of the torsion bar to said control means, said control means being operable to effect movement of said inlet valve member to increase the rate of flow of fluid to said pump as the amount of twist of said torsion bar increases.

5. An apparatus as defined in claim 4 wherein said inlet valve member has a first position limiting fluid flow to said pump, said control means being operable to effect movement of said inlet valve member from said first position, said apparatus further including means for untwisting said torsion bar as said steerable wheel moves, said sensor means being operable to sense a return of said torsion bar to its untwisted state and to cause said inlet valve member to return to its first position.

6. An apparatus as defined in claim 5 wherein said control means includes a solenoid for moving said inlet valve member to a position in accordance with the current flowing therethrough and a spring biasing said inlet valve member to its first position and against which said solenoid acts.

7. An apparatus as set forth in claim 1 wherein said first and second valve members are in their open positions prior to initiation of a steering operation to communicate said pump with said first and second outlet ports.

8. An apparatus comprising:
 a fluid reservoir,
 a pump for pumping fluid from said reservoir, said pump including an inlet, an outlet, a rotor, a cam ring circumscribing said rotor, and a plurality of pumping elements movable with said rotor and which engage a cam surface of said cam ring and define pumping chambers,
 flow control valve means located between said reservoir and said pumping chambers for varying the flow of fluid from said reservoir to said pumping chambers, and
 pressure limiting valve means located between said reservoir and said pumping chambers for limiting pump outlet pressure, said pressure limiting valve means including a valve member responsive to an increase in outlet pressure to restrict fluid flow to said pumping chambers, said pressure limiting valve means and flow control valve means being mounted on said cam ring in series fluid communication.

9. An apparatus as set forth in claim 8 wherein said flow control valve means includes a valve member and an electrically energizable actuator mounted on said cam ring, said apparatus further including control means for effecting movement of said valve member during a steering operation.

10. An apparatus as set forth in claim 8 wherein each valve means comprises a reed valve attached to said cam ring, said cam ring having an axial passage therethrough and the respective reed valves being located at opposite ends of said passage.

11. An apparatus for controlling the operation of a power steering motor having opposite chambers for receiving fluid to turn a steerable vehicle wheel in opposite directions, said apparatus comprising
a pump for supplying fluid under pressure,
a reservoir containing a supply of fluid for said pump,
a directional control valve assembly connected in fluid communication with said pump and operable to direct fluid from said pump to one of the chambers of the power steering motor depending on the direction of turning of the vehicle wheel,
a flow control valve operable to vary the flow of fluid from said pump to said directional control valve assembly for both directions of turning of the vehicle wheel, and
electrical control means for effecting actuation of said directional control valve assembly to effect operation of the power steering motor and for effecting actuation of said flow control valve to increase the fluid pressure conducted to said directional control valve assembly and power steering motor after actuation of said directional control valve assembly.

12. An apparatus as set forth in claim 11 further including sensor means for sensing vehicle speed, said control means including means to effect operation of said flow control valve to reduce the rate of flow of fluid from said pump as vehicle speed increases.

13. An apparatus as set forth in claim 11 further including sensor means for sensing the speed of rotation of a manually actuated steering member, said control means including means to effect operation of said flow control valve to increase the rate of flow of fluid from said pump as the speed of rotation of the manually actuatable steering member increases.

14. An apparatus as set forth in claim 11 further including sensor means for sensing the torque applied to a manually rotatable steering member and said control means including means for effecting operation of said flow control valve to increase the rate of flow of fluid to said pump as the torque applied to said manually rotatable steering member increases.

* * * * *